United States Patent
Gaffney et al.

(10) Patent No.: US 6,409,940 B1
(45) Date of Patent: Jun. 25, 2002

(54) NICKEL-RHODIUM BASED CATALYSTS AND PROCESS FOR PREPARING SYNTHESIS GAS

(75) Inventors: Anne M. Gaffney; David R. Corbin, both of West Chester, PA (US)

(73) Assignee: Conoco Inc., Houston, TX (US)

( * ) Notice: Subject to any disclaimer, the term of this patent is extended or adjusted under 35 U.S.C. 154(b) by 0 days.

(21) Appl. No.: 09/687,684

(22) Filed: Oct. 13, 2000

Related U.S. Application Data

(60) Provisional application No. 60/160,100, filed on Oct. 18, 1999.

(51) Int. Cl.$^7$ .............................. C07C 1/02; C01B 3/02; C01B 3/24; C01B 3/26; C01B 31/18
(52) U.S. Cl. .................... 252/373; 423/648.1; 423/650; 423/651; 423/418.2
(58) Field of Search ....................... 252/373; 423/648.1, 423/650, 651, 418.2

(56) References Cited

U.S. PATENT DOCUMENTS

| | | | |
|---|---|---|---|
| 3,334,055 A | 8/1967 | Dowden et al. | 252/273 |
| 3,953,363 A | 4/1976 | Yamauchi et al. | 252/443 |
| 4,209,424 A | 6/1980 | Le Goff et al. | 252/454 |
| 4,325,842 A | 4/1982 | Slaugh et al. | 252/443 |
| 4,690,777 A | 9/1987 | Valenyi et al. | 252/373 |
| 4,877,550 A | 10/1989 | Goetsch et al. | 252/373 |
| 5,039,510 A | 8/1991 | Pinto | 423/652 |
| 5,149,464 A | 9/1992 | Green et al. | 252/373 |
| 5,447,705 A | 9/1995 | Petit et al. | 423/418.2 |
| 5,500,149 A | 3/1996 | Green et al. | 252/373 |
| 5,510,056 A | 4/1996 | Jacobs et al. | 252/373 |
| 5,614,163 A * | 3/1997 | Bhattacharyya et al. | 423/418.2 |
| 5,648,582 A | 7/1997 | Schmidt et al. | 585/652 |
| 5,653,774 A | 8/1997 | Bhattacharyya et al. | 48/198.7 |
| 5,744,419 A | 4/1998 | Choudhary et al. | 502/326 |
| 6,060,420 A | 5/2000 | Munakaa et al. | 502/302 |

FOREIGN PATENT DOCUMENTS

| | | | |
|---|---|---|---|
| EP | 0333037 A2 | 3/1989 | C01B/3/40 |
| GB | 1040066 | 8/1966 | |

OTHER PUBLICATIONS

Basile et al., Catalytic behavior of Ni–and Rh containing catalyst in partial oxidation of methane, Stud. Surf. Sci. Catal. (1998), 119 (Natural Gas Conversion V), 393–698.*

Xu, Xiaoding, and Jacob A. Moulijn (Chapter 21) "Transformation of a Structural Carrier into a Structured Catalyst in Structured Catalysts and Reactors", (Andrzej Cybulski and Jacob A. Moulijn, eds.), Marcel Dekker, Inc. 599–615 (1998).

Claridge, John B., York, Andrew P.E., Brungs, Attila J., Alvarez, Carlos Marquez–, Sloan, Jeremy, Tsang, Shik Chi, and Malcolm Green, L.H., New Catalysts for the Conversion of Methane of Synthesis Gas: Molybdenum and Tungsten Carbide:, Journal of Catalysis 180, 85–100 (1998).

Vernon, Patrick D.F., Green, Malcolm L.H., Cheetham, Anthony K. and Ashcroft, Alexander T., "Partial Oxidation of Methane to Synthesis Gas", Catalysis Letters 6, 181–186, (1990).

Choudhary, V.R., Uphade, B.S., and Mamman A.S., "Oxidative Conversion of Mehane to Syngas over Nickel Supported on Commercial Low Surface Area Porous Catalyst Carriers Precoated with Alkaline and Rare Earth Oxides", Journal of Catalysis 172, 281–293 (1997).

Choudhary, V.R., Rajput, A.M., and Mamman, A.S., NiO––Alkaline Earth Oxide Catalyssts for Oxidative Mehane–to––Syngas Conversion: Influenceof Alkaline Earth Oxide on the Surface Properties and Temperature–Programmed Reduction/Reaction by $H_2$ and Methane, Journal of Catalysis 178, 576–585 (1998).

Choudhary, V.R, Uphade, B.S. and Mamman, A.S., "Large enhancement in methane–to–syngas conversion activity of supported Ni catalysts due to precoating of catalyst supports with MgO, CaO or rare–earth oxide", Catalysis Letters 32, 387–390 (1995).

* cited by examiner

*Primary Examiner*—Johann Richter
*Assistant Examiner*—J. Parsa
(74) *Attorney, Agent, or Firm*—Conley, Rose & Tayon P.C.

(57) ABSTRACT

A process of preparing a product gas mixture comprising CO and $H_2$ from a light hydrocarbon and $O_2$ mixture is disclosed. The process includes contacting a reactant gas mixture comprising a $C_1$–$C_5$ hydrocarbon and a source of molecular oxygen with a catalytically effective amount of a supported catalyst comprising nickel and rhodium. The catalyst and reactant gas mixture is maintained at catalytic partial oxidation promoting conditions of temperature and pressure during the contacting period, which is preferably 10 milliseconds or less. Certain preferred catalysts comprise an alloy of about 10–50 weight percent nickel and about 0.01–10 weight percent rhodium on a porous refractory support structure.

32 Claims, No Drawings

NICKEL-RHODIUM BASED CATALYSTS AND PROCESS FOR PREPARING SYNTHESIS GAS

CROSS-REFERENCE TO RELATED APPLICATIONS

This application claims the benefit of U.S. Provisional Application No. 60/160,100 filed Oct. 18, 1999, the disclosure of which is incorporated herein by reference.

BACKGROUND OF THE INVENTION

1. Field of the Invention

The present invention relates to precesses for producing synthesis gas from light hydrocarbons (e.g., natural gas) and oxygen. More particularly, the invention relates to supported nickel-rhodium based catalysis, their methods of making, and to processes employing such catalysts for net partial oxidation of light hydrocarbons (e.g., natureal gas) to products comprising CO and $H_2$.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversation of methane to hydrocarbons is typically carried out in two steps. In the first step, methane is reformed with water to produce carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes.

Current industrial use of methane as a chemical feedstock proceeds by the initial conversion of methane to carbon monoxide and hydrogen by either steam reforming, which is the most widespread process, or by dry reforming. Steam reforming currently is the major process used commercially for the conversion of methane to synthesis gas, proceeding according to Equation 1.

$$CH_4 + H_2O \Leftrightarrow CO + 3H_2 \qquad (1)$$

Although steam reforming has been practiced for over five decades, efforts to improve the energy efficiency and reduce the capital investment required for this technology continue.

The catalytic partial oxidation of hydrocarbons, e.g., natural gas or methane to syngas is also a process known in the art. While currently limited as an industrial process, partial oxidation has recently attracted much attention due to significant inherent advantages, such as the fact that significant heat is released during the process, in contrast to steam reforming processes.

In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

$$CH_4 + 1/2 O_2 \Leftrightarrow CO + 2H_2 \qquad (2)$$

This ratio is more useful than the $H_2$:CO ratio from steam reforming for the downstream conversion of the syngas to chemicals such as methanol and to fuels. The partial oxidation is also exothermic, while the steam reforming reaction is strongly endothermic. Furthermore, oxidation reactions are typically much faster than reforming reactions. This allows the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch Synthesis.

The selectivities of catalytic partial oxidation to the desired products, carbon monoxide and hydrogen, are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by prior art catalytic partial oxidation processes have placed these processes generally outside the limits of economic justification.

For successful operation at commercial scale, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance. Accordingly, substantial effort has been devoted in the art to the development of catalysts allowing commercial performance without coke formation.

A number of process regimes have been proposed in the art for the production of syngas via catalyzed partial oxidation reactions. For example, the process described in U.S. Pat. No. 4,877,550 employs a syngas generation process using a fluidized reaction zone. Such a process however, requires downstream separation equipment to recover entrained supported-nickel catalyst particles.

To overcome the relatively high pressure drop associated with gas flow through a fixed bed of catalyst particles, which can prevent operation at the high gas space velocities required, various structures for supporting the active catalyst in the reaction zone have been proposed. U.S. Pat. No. 5,510,056 discloses a monolithic support such as a ceramic foam or fixed catalyst bed having a specified tortuosity and number of interstitial pores that is said to allow operation at high gas space velocity. Catalysts used in that process include ruthenium, rhodium, palladium, osmium, iridium, and platinum. Data are presented for a ceramic foam supported rhodium catalyst at a rhodium loading of from 0.5–5.0 wt %.

U.S. Pat. No. 5,648,582 discloses a process for the catalytic partial oxidation of methane at space velocities of 800,000 hr$^{-1}$ to 12,000,000 hr$^{-1}$ on certain supported Rh, Ni or Pt catalysts. The exemplified catalysts are rhodium and platinum, at a loading of about 10 wt %, on alumina foams. The small catalyst bed used in this process is said to eliminate hot spots which are typical of relatively thick catalyst beds.

Catalysts containing Group VIII metals such as nickel or rhodium on a variety of supports are known in the art. For example, V. R. Choudhary et al. ("Oxidative Conversion of Methane to Syngas over Nickel Supported on Low Surface Area Catalyst Porous Carriers Precoated with Alkaline and Rare Earth Oxides," *J. Catalysis* 172:281–293 (1997)) disclose the partial oxidation of methane to syngas at contact times of 4.8 ms (at STP) over supported nickel catalysts at 700 and 800° C. The catalysts were prepared by depositing NiO—MgO on different commercial low surface area porous catalyst carriers consisting of refractory compounds such as $SiO_2$, $Al_2O_3$, SiC, $ZrO_2$ and $HfO_2$. The catalysts were also prepared by depositing NiO on the catalyst carriers with different alkaline and rare earth oxides such as MgO, CaO, SrO, BaO, $Sm_2O_3$ and $Yb_2O_3$.

U.S. Pat. No. 4,690,777 also discloses catalysts comprising Group VIII metals, such as Ni, on porous supports, for use in reforming hydrocarbons to produce CO and $H_2$.

U.S. Pat. No. 5,149,464 discloses a method for selectively converting methane to syngas at 650° C. to 950° C. by contacting the methane/oxygen mixture with a solid catalyst comprising a supported d-Block transition metal, transition metal oxide, or a compound of the formula $M_xM'_yO_z$ wherein M' is a d-Block transition metal and M is Mg, B, Al, GA, Si, Ti, Xr, Hf or a lanthanide.

U.S. Pat. No. 5,500,149 discloses various transition metals that can act as catalysts in the reaction $CO_2+CH_4\rightarrow 2CO+2H_2$, and demonstrates how reaction conditions can affect the product yield. The partial oxidation of methane to synthesis gas using various transition metal catalysts under a range of conditions has been described by Vernon, D. F. et al. (*Catalysis Letters* 6:181–186 (1990)). European Pat. App. Pub. No. 640561 discloses a catalyst for the catalytic partial oxidation of hydrocarbons comprising a Group VIII metal on a refractory oxide having at least two cations.

U.S. Pat. No. 5,447,705 discloses a catalyst having a perovskite crystalline structure and the general composition: $Ln_xA_{1-y}B_yO_3$, wherein Ln is a lanthanide and A and B are different metals chosen from Group IVb, Vb, VIb, VIIb or VIII of the Periodic Table of the Elements.

U.S. Pat. No. 5,653,774 discloses a nickel-containing catalyst for preparing synthesis gas which are prepared by heating hydrotalcite-like compositions having the general formula:

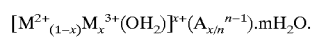

A previous attempt at synthesis gas production by catalytic partial oxidation to overcome some of the disadvantages and costs typical of steam reforming is described in European Patent No. EPO 0 303 438, entitled "Production of Methanol from Hydrocarbonaceous Feedstock."

One disadvantage of many of the existing catalytic hydrocarbon conversion methods is the need to include steam in the feed mixture to suppress coke formation on the catalyst. Another drawback of some of the existing processes is that the catalysts that are employed often result in the production of significant quantities of carbon dioxide, steam, and $C_2$+ hydrocarbons. Also, large volumes of expensive catalyst are typically required in order to achieve satisfactory conversion of the feed gas, and to achieve the necessary level of selectivity for CO and $H_2$ products. None of the existing processes or catalysts are capable of providing high conversion of reactant gas and high selectivity of CO and $H_2$ reaction products. Accordingly, there is a continuing need for a process and catalyst for the catalytic partial oxidation of hydrocarbons, particularly methane, or methane containing feeds, in which the catalyst retains a higher level of activity and selectivity to carbon monoxide and hydrogen under conditions of high gas space velocity, elevated pressure and high temperature.

SUMMARY OF THE INVENTION

The present invention provides catalysts and processes for preparing synthesis gas from any gaseous hydrocarbon having a low boiling point (e.g. $C_1$–$C_5$ hydrocarbons, particularly methane, or methane containing feeds) and a source of molecular oxygen. One advantage of the new catalysts is that they retain a high level of activity and selectivity to carbon monoxide and hydrogen under conditions of high gas space velocity, elevated pressure and high temperature.

The new processes of the invention are particularly useful for converting gas from naturally occurring reserves of methane which contain carbon dioxide. Another advantage of the new catalysts and processes is that they are economically feasible for use in commercial-scale conditions. In a short contact time reactor, the new Ni—Rh based catalysts are highly active for catalyzing the oxidation of methane to syngas by an overall or net partial oxidation process. "Net partial oxidation" means that the partial oxidation reaction predominates over reforming reactions, and the ratio of the $H_2$:CO products is about 2. The short contact time reactor permits the reactant gas mixture to contact or reside on the catalyst for no longer than about 10 milliseconds, operating at high space velocities.

In accordance with certain embodiments of the present invention a supported catalyst is provided for catalyzing the net partial oxidation of a hydrocarbon. The supported catalyst contains about 1–50 weight percent nickel and about 0.01–10 weight percent rhodium, and a support structure. Preferably, the support structure comprises a spinel, a perovskite, magnesium oxide, a pyrochlore, a brownmillerite, zirconium phosphate, magnesium stabilized zirconia, zirconia stabilized alumina, silicon carbide, yttrium stabilized zirconia, calcium stabilized zirconia, yttrium aluminum garnet, alumina, cordierite, $ZrO_2$, $MgAl_2O_4$, $SiO_2$ or $TiO_2$. The rhodium and nickel are disposed on or within the support structure. In some of the more preferred embodiments, the catalyst support structure is a spinel, a perovskite, a pyrochlore or a brownmillerite, and the nickel-rhodium alloy is incorporated into the support structure. In some embodiments the catalyst comprises a solid solution of rhodium-nickel-magnesium-oxide.

In certain embodiments of the catalysts the support structure comprises a refractory oxide, which may be in the form of a foam structure. Preferably such a foam structure comprises about 12–60 pores per centimeter of structure. Alternatively, the support structure may be in the form of a honeycomb monolith structure.

In some embodiments, the catalyst comprises a mixture of rhodium and nickel on a support structure comprising $Al_2O_3$. Some embodiments comprise an alloy of 1% rhodium, 3% manganese and 13% nickel on a $MgAl_2O_4$ support structure. In some embodiments the catalyst comprises 1% rhodium and $LaZr_{0.5}Ni_{0.5}O_3$ (expressed as stoichiometric amounts). Another catalyst embodiment comprises $Rh_{0.02}Ni_{0.03}Mg_{0.95}O$, and yet another comprises rhodium, nickel and cobalt on a support structure comprising $ZrO_2$. Certain catalysts of the invention comprise 1% rhodium, 10.9% nickel and 8.6% magnesium on a support structure comprising 99% $Al_2O_3$.

Also provided by the present invention are processes for the net partial oxidization of a 1–5 carbon containing hydrocarbon to form a product gas mixture comprising CO and $H_2$. In some embodiments the process comprises contacting a reactant gas mixture comprising the hydrocarbon and a source of oxygen with a catalytically effective amount of a Ni—Rh alloy-containing catalyst having a composition as described above. The process also includes maintaining the catalyst and the reactant gas mixture at conversion promoting conditions of temperature, gas flow rate and feed composition during contact with the reactant gas mixture. Preferably the process includes maintaining the reactant gas mixture and the catalyst at a temperature of about 600–1,200° C. during contact. In some embodiments the temperature is maintained at about 700–1,100° C.

In some embodiments of the process the reactant gas mixture and the catalyst are maintained at a pressure of about 100–12,500 kPa during the contacting, and in some of the more preferred embodiments the pressure is maintained at about 130–10,000 kPa.

Certain embodiments of the processes for converting hydrocarbons to CO and $H_2$ comprise mixing a methane-containing feedstock and an oxygen-containing feedstock to provide a reactant gas mixture feedstock having a carbon:oxygen ratio of about 1.25:1 to about 3.3:1. In some of these embodiments, the mixing step is such that it yields a reactant gas mixture feed having a carbon:oxygen ratio of about 1.3:1 to about 2.2:1, or about 1.5:1 to about 2.2:1. In some of the most preferred embodiments the mixing step provides a reactant gas mixture feed having a carbon:oxygen ratio of about 2:1.

In some embodiments of the processes the said oxygen-containing gas that is mixed with the hydrocarbon comprises steam or $CO_2$, or a mixture of both. In some embodiments of the processes the $C_1$–$C_5$ hydrocarbon comprises at least about 50% methane by volume, and in some of the preferred embodiments the $C_1$–$C_5$ hydrocarbon comprises at least about 80% methane by volume.

Certain embodiments of the processes for preparing synthesis gas comprise preheating the reactant gas mixture. Some embodiments of the processes comprise passing the reactant gas mixture over the catalyst at a space velocity of about 20,000 to about 100,000,000 normal liters of gas per kilogram of catalyst per hour (NL/kg/h). In certain of these embodiments, the gas mixture is passed over the catalyst at a space velocity of about 50,000 to about 50,000,000 NL/kg/h. Preferably the residence time of the reactant gas mixture on the catalyst is no more than about 10 milliseconds duration.

In some embodiments of the processes of the present invention the catalyst is retained in a fixed bed reaction zone. These and other embodiments, features and advantages of the present invention will become apparent with reference to the following description.

DETAILED DESCRIPTION OF PREFERRED EMBODIMENTS

Preferred Ni—Rh based catalysts for catalytically converting $C_1$–$C_5$ hydrocarbons to CO and $H_2$ comprise an alloy of about 1 wt % to about 50 wt % nickel and 0.01 to 10 wt % rhodium on supports of spinels, perovskites, magnesium oxide, pyrochlores, brownmillerites, zirconium phosphate, magnesium stabilized zirconia, zirconia stabilized alumina, silicon carbide, yttrium stabilized zirconia, calcium stabilized zirconia, yttrium aluminum garnet, alumina, cordierite, $ZrO_2$, $MgAl_2O_4$, $SiO_2$ or $TiO_2$. The Rh and/or Ni may be incorporated into the structure of the spinel, perovskite, pyrochlore or brownmillerite. Alternatively, a solid solution of Rh—Ni—Mg-oxide may be used. Preferably the catalyst is a Ni—Rh alloy. A Rh-Ni based catalyst is prepared as described in the following examples and utilizing techniques known to those skilled in the art, such as impregnation, wash coating, adsorption, ion exchange, precipitation, co-precipitation, deposition precipitation, sol-gel method, slurry dip-coating, microwave heating, and the like, or any of the other methods known in the art. Preferred techniques are impregnation, sol-gel methods and co-precipitation. For example, a Rh-Ni based catalyst is prepared by impregnation of a ceramic foam of a refractory oxide with rhodium and nickel.

Alternatively, the catalyst components, with or without a ceramic support composition, may be extruded to prepare a three-dimensional form or structure such as a honeycomb, foam, or other suitable tortuous-path structure. Additionally the catalyst components may be added to the powdered ceramic composition and then extruded to prepare the foam or honeycomb. Suitable foams for use in the preparation of the catalyst include those having from 30 to 150 pores per inch (12 to 60 pores per centimeter). Alternative forms for the catalyst include refractory oxide honeycomb monolith structures, or other configurations having longitudinal channels or passageways permitting high space velocities with a minimal pressure drop. Such configurations are known in the art and described, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst")

Any suitable reaction regime may be applied in order to contact the reactants with the catalyst. One suitable regime is a fixed bed reaction regime, in which the catalyst is retained within a reaction zone in a fixed arrangement. Particles of catalyst may be employed in the fixed bed regime, retained using fixed bed reaction techniques well known in the art. Alternatively, the catalyst may be in the form of a foam, or porous monolith.

Process of Producing Syngas

A feed stream comprising a hydrocarbon feedstock and an oxygen-containing gas is contacted with one of the above-described Rh—Ni alloy catalysts in a reaction zone maintained at conversion-promoting conditions effective to produce an effluent stream comprising carbon monoxide and hydrogen. Preferably a millisecond contact time reactor is employed. The hydrocarbon feedstock may be any gaseous hydrocarbon having a low boiling point, such as methane, natural gas, associated gas, or other sources of light hydrocarbons having from 1 to 5 carbon atoms. The hydrocarbon feedstock may be a gas arising from naturally occurring reserves of methane which contain carbon dioxide. Preferably, the feed comprises at least 50% by volume methane, more preferably at least 75% by volume, and most preferably at least 80% by volume methane.

The hydrocarbon feedstock is in the gaseous phase when contacting the catalyst. The hydrocarbon feedstock is contacted with the catalyst as a mixture with an oxygen-containing gas, preferably pure oxygen. The oxygen-containing gas may also comprise steam and/or $CO_2$ in addition to oxygen. Alternatively, the hydrocarbon feedstock is contacted with the catalyst as a mixture with a gas comprising steam and/or $CO_2$.

Preferably, the methane-containing feed and the oxygen-containing gas are mixed in such amounts to give a carbon (i.e., carbon in methane) to oxygen (i.e., oxygen) ratio from about 1.25:1 to about 3.3:1, more preferably, from about 1.3:1 to about 2.2:1, and most preferably from about 1.5:1 to about 2.2:1, especially the stoichiometric ratio of 2:1.

The process is operated at atmospheric or superatmospheric pressures, the latter being preferred. The pressures may be from about 100 kPa to about 12,500 kPa, preferably from about 130 kPa to about 10,000 kPa.

The process is preferably operated at temperatures of from about 60° C. to about 1200° C., preferably from about 700° C. to about 1100° C. The hydrocarbon feedstock and the oxygen-containing gas are preferably pre-heated before contact with the catalyst.

The hydrocarbon feedstock and the oxygen-containing gas are passed over the catalyst at any of a variety of space velocities. Space velocities for the process, stated as normal liters of gas per kilogram of catalyst per hour, are from about 20,000 to about 100,000,000 NL/kg/h, preferably from about 50,000 to about 50,000,000 NL/kg/h. Preferably the catalyst is employed in a millisecond contact time reactor for syngas production. The product gas mixture emerging from the reactor is collected and analyzed for $CH_4$, $O_2$, CO, $H_2$, $CO_2$, etc.

EXAMPLES

Catalyst Preparation

Exemplary and comparative catalysts were prepared with and without the inclusion of rhodium, as described Examples 1–12, below. In these examples, calcining was conducted according to the following program: heat at a rate of 10° C./min. up to within about 50° of the target temperature, hold about 30 min., then heat at a rate of 1° C./min up to the desired final temperature. Catalyst activities were tested in partial oxidation reactions at defined high gas hourly space velocities, temperature and feed composition. The level of $CH_4$ conversion and selectivities to CO and $H_2$ products are reported below.

Example 1

3% Mn, 13% Ni/$MgAl_2O_4$

The 3% Mn, 13% Ni/$MgAl_2O_4$ catalyst was prepared by dissolving Ni$(NO_3)_2 \cdot 6H_2O$ (19.325 g) and $Mn(NO_3)_2 \cdot 6H_2O$ (4.702 g) in distilled water (50 ml) and wet impregnating calcined (600° C. for 3 hours) $MgAl_2O_4$ (25.2 g). The slurry was mixed with a spatula, dried at 110° C. and calcined at 800° C. for 2 hours. A portion of the calcined material (15 g) was reduced in flowing hydrogen (about 100 cc/minute) for 4 hours at 800° C.

Example 2

1% Rh added to 3% Mn, 13% Ni/$MgAl_2O_4$

Rh (III) chloride (0.264 g) was dissolved in 250 ml of acetone and 5 ml of water. The catalyst of 3% Mn, 13% Ni on $MgAl_2O_4$ (10 g) was added to the solution and acetone was evaporated off. The solid was calcined at 600° C. for 1 hr and then reduced at 600° C. for 4 hours with 10% $H_2$ in $N_2$ at a flow of 100 ml/min. High Resolution Transmission Electron Microscopy (HRTEM) and X-ray Adsorption Spectroscopy (XAS) analyses indicated that the catalyst was comprised of a Ni—Rh alloy.

Example 3

$LaZr_{0.5}Ni_{0.5}O_3$

To a round bottom flask was added 61.61 g of $ZrO_2$, 100 ml of 1M $La(NO_3)_3$ and 50 ml of 1M $Ni(NO_3)_2$. The water was removed from the mixture on a rotoevaporator and dried in a vacuum oven. Calcination was carried out at 900° C. for 100 hours with daily grinding and mixing.

Example 4

1% Rh on $LaZr_{0.5}Ni_{0.5}O_3$

Rh (III) chloride (0.0176 g) was dissolved in 50 ml of acetone and 1 ml of water. The catalyst of $LaZr_{0.5}Ni_{0.5}O_3$ (0.6811 g) was added to the solution and acetone was evaporated off. The solid was calcined at 600° C. for 1 hr and then reduced at 600° C. for 4 hours with 10% $H_2$ in $N_2$ at a flow of 100 ml/min. HRTEM and XAS analyses indicated that the catalyst was comprised of a Ni—Rh alloy.

Example 5

$Ni_{0.03}Mg_{0.97}O$

The nickel magnesia solid solution was prepared by the co-precipitation method. From a mixed aqueous solution (1 L) of 4.50 g of nickel acetate tetrahydrate and 150.38 g of magnesium nitrate hexahydrate, their mixed carbonate was deposited by adding (1L) 3 M potassium carbonate aqueous solution at 60° C. After being filtered and washed with hot water, the precipitate was dried overnight at 120° C. for 12 hours, and then calcined in air at 950° C. for 10 h to yield 25 g of catalyst. The catalyst was reduced by hydrogen at 850° C. for 0.5 h.

Example 6

$Rh_{0.02} Ni_{0.03}Mg_{0.95}O$

An acetone solution of 1.93 g of rhodium acetylacetonate complex was impregnated onto 10 g of the calcined $Ni_{0.03}Mg_{0.97}O$. The solvent was evaporated off at room temperature and the solid material was calcined in air at 950° C. for 10 hours and then reduced by hydrogen at 850° C. for 0.5 h. HRTEM and XAS analyses indicated that the catalyst was comprised of a Ni—Rh alloy.

Example 7

Co, Ni/$ZrO_2$

A mixture containing 2.24 g of $Co(NO_3)_2 \cdot 6H_2O$ and 2.22 g of $Ni(NO_3)_2 \cdot 6H_2O$ was prepared. To this mixture was added sufficient water to give a final volume of 15 ml. The resulting solution was added to 30 g of $ZrO_2$ (⅛" pellets, dried at 110° C.). The "wet" pellets were air dried with stirring every 4 hours to ensure uniform drying. The air-dried pellets were calcined in air at 600° C. for 3 hours.

Example 8

Co, Ni, Rh/$ZrO_2$

A mixture containing 2.22 g of $Co(NO_3)_2 \cdot 6H_2O$, 2.23 g of $Ni(NO_3)_2 \cdot 6H_2O$ and 12.63 g of a 10% solution of $Rh(NO_3)_3$ was prepared. To this mixture was added sufficient water to give a final volume of 15 ml. The resulting solution was added to 30 g of $ZrO_2$ (⅛" pellets, dried at 110° C.). The "wet" pellets were air dried with stirring every 4 hours to ensure uniform drying. The air-dried pellets were calcined in air at 600° C. for 3 hours. HRTEM and XAS analyses indicated that the catalyst was comprised of a Ni—Rh alloy.

Example 9

$NiAl_2O_4$

1$(NO_3)_3 \cdot 9H_2O$ (3.75 g) and 1.45 g $Ni(NO_3)_2 \cdot 6H_2O$ (1.45 g) were dissolved in 10 ml distilled $H_2O$ with 0.1 g of polyvinyl alcohol added for improved viscosity. To 1 g of alpha alumina spheres (diameter 2 mm) was added 2 mL of this solution. The solvent was removed with a rotoevaporator at high temperature and the resulting material was calcined at 800° C. for 2 hrs. HRTEM analysis confirmed formation of $NiAl_2O_4$.

Example 10

1% Rh/$NiAl_2O_4$ $NiAl_2O_4$ (0.8025 g) was impregnated with a solution of 0.0208 g of $RhCl_3 \cdot 3H_2O$ dissolved in 0.15 g of $H_2O$ and 2.0 g of acetone. The solvent was evaporated off at room temperature and the resulting material was dried in a vacuum oven over night at 110° C. and then calcined at 600° C. for 1 hour. Subsequent reduction was carried out at 600° C. for 4 hours with 90 mL/min $N_2$ and 10 mL/min $H_2$. HRTEM and XAS analyses indicated that the catalyst was comprised of a Ni—Rh alloy.

Test Procedure for Examples 1–10

The catalysts were evaluated in a laboratory scale short contact time reactor, i.e., a 25 cm long×4 mm i.d. quartz tube reactor equipped with a co-axial quartz thermocouple well. The void space within the reactor was packed with quartz chips. The catalyst bed was positioned with quartz wool at about the mid-length of the reactor. The catalyst bed was heated with a 4 inch (10.2 cm) 600 watt band furnace at 90% electrical output. All runs were done at a $CH_4:O_2$ molar ratio of 2:1 and at a pressure of 5 psig (136 kPa). The reactor effluent was analyzed using a gas chromatograph equipped with a thermal conductivity detector. The C, H and O mass balance were all between 98% and 102%. The runs were conducted over two operating days with 6 hours of run time each day. The comparative results of these runs are shown in Table 1, wherein gas hourly space velocity is indicated by "GHSV." As shown in Table 1, no evidence of catalyst deactivation occurred after 12 hours. The comparative sets of examples, with and without Rh, show that the inclusion of Rh into the respective catalyst compositions resulted in higher $CH_4$ conversion and selectivities to CO and $H_2$ and lower catalyst bed temperatures.

TABLE 1

| Ex. | Temp °C. | GHSV × $10^5$ | % $CH_4$/% $O_2$ Conv. | % CO/% $H_2$ Sel. | $H_2$:CO |
|---|---|---|---|---|---|
| 1 | 850 | 3.045 | 92/100 | 99/97 | 1.96 |
| 1 | 850 | 6.09 | 86/100 | 94/90 | 1.91 |
| 2 | 700 | 3.045 | 99/100 | 100/100 | 2.0 |
| 2 | 700 | 6.09 | 91/100 | 99/100 | 2.02 |
| 3 | 875 | 1.523 | 57/99 | 87/77 | 1.77 |
| 4 | 720 | 3.48 | 88/100 | 98/99 | 2.02 |
| 4 | 720 | 5.916 | 83/100 | 96/94 | 1.96 |
| 5 | 830 | 3.045 | 67/95 | 95/78 | 1.64 |
| 6 | 810 | 3.045 | 91/100 | 98/97 | 1.98 |
| 7 | 820 | 1.826 | 81/100 | 93/91 | 1.96 |
| 8 | 795 | 1.826 | 90/100 | 97/97 | 2.00 |
| 9 | 725 | 2.436 | 76/96 | 94/83 | 1.77 |
| 10 | 650 | 2.436 | 82/100 | 100/92 | 1.84 |

Example 11

12.7% Ni, 8.2% Mg on 99% $Al_2O_3$ (12 mm OD×10 mm Ceramic Foam of 80 ppi)

The $Al_2O_3$ monolith (1.1688 g) was first impregnated with a solution of 1.3839 g of $Mg(NO_3)_2 6H_2O$ in 1 mL of $H_2O$ followed by evaporating off the solvent at room temperature, drying in a vacuum oven at 110° C. for overnight, then calcining at 900° C. for 4 hrs. The monolith was subsequently impregnated with one half the volume of a solution of 0.9990 g of $Ni(NO3)_2 6H_2O$ dissolved in 2 mL of water. The solvent was evaporated off at room temperature, dried in a vacuum oven at 110° C. overnight, and calcined at 600° C. for 1 hr. The impregnation procedure was repeated with the remaining Ni nitrate solution and again the impregnated monolith was dried in a vacuum oven at 110° C. overnight and calcined at 600° C. for 1 hr.

Example 12

1% Rh, 10.9% Ni, 8.6% Mg on 99% $Al_2O_3$ (12 mm OD×10 mm Ceramic Foam of 80 ppi)

The $Al_2O_3$ monolith (1.1356 g) was first impregnated with a solution of 1.3997 g of $Mg(NO_3)_2 6H_2O$ in 1 mL of $H_2O$ followed by evaporating off the solvent at room temperature, drying in a vacuum oven at 110° C. overnight, then calcining at 900° C. for 4 hrs. The monolith was subsequently impregnated with one half the volume of a solution of 0.8308 g of $Ni(NO_3)_2 6H_2O$ dissolved in 2 mL of water. The solvent was evaporated off at room temperature, dried in a vacuum oven at 110° C. overnight, and calcined at 600° C. for 1 hr. The impregnation procedure was repeated with the remaining Ni nitrate solution and again the impregnated monolith was dried in a vacuum oven at 110° C. overnight and calcined at 600° C. for 1 hr. $RhCl_3 3H_2O$ (0.0394 g) was dissolved in 2 drops of $H_2O$ and 1 mL of acetone and the solution was dripped onto the monolith. The solvents were evaporated at room temperature, dried in a vacuum oven at 110° C. overnight, and calcined at 600° C. for one hr. HRTEM and XAS analyses indicated that the catalyst was comprised of a Ni—Rh alloy.

Test Procedure for Examples 11 and 12

The partial oxidation reactions were done with a conventional flow apparatus using a 19 mm O.D.×13 mm I.D. and 12" long quartz reactor. A ceramic foam of 99% $Al_2O_3$ (12 mm OD×5 mm of 45 ppi) were placed before and after the catalyst as radiation shields. The inlet radiation shield also aided in uniform distribution of the feed gases. An Inconel sheathed, single point K-type (Chromel/Alumel) thermocouple (TC) was placed axially inside the reactor touching the top (inlet) face of the radiation shield. A high temperature S-Type (Pt/Pt 10% Rh) bare-wire TC was positioned axially touching the bottom face of the catalyst and was used to indicate the reaction temperature. The catalyst and the two radiation shields were sealed tight against the walls of the quartz reactor by wrapping them radially with a high purity (99.5%) alumina paper. A 600 watt band heater set at 90% electrical output was placed around the quartz tube, providing heat to light off the reaction and to preheat the feed gases. The bottom of the band heater corresponded to the top of the upper radiation shield. In addition to the TCs placed above and below the catalyst, the reactor also contained two axially positioned, triple-point TCs, one before and another after the catalyst. These triple-point thermocouples were used to determine the temperature profiles of reactants and products subjected to preheating and quenching, respectively.

All runs were carried out at a $CH_4:O_2$ molar ratio of 2:1 with a combined flow rate of 7.7 standard liters per minute (SLPM) (431,720 GHSV) and at a pressure of 5 psig (136 kPa). The reactor effluent was analyzed using a gas chromatograph equipped with a thermal conductivity detector. The C, H and O mass balance were all between 98% and 102%. Table 2 shows the results for the comparative set, with and without Rh. The inclusion of Rh in the catalyst composition resulted in higher $CH_4$ conversion and higher selectivities to CO and $H_2$ products.

TABLE 2

| Ex. | Preheat Temp. °C. | Catal. Temp. °C. | % $CH_4$/% $O_2$ Conv. | % CO/% $H_2$ Sel. | $H_2$:CO |
|---|---|---|---|---|---|
| 11 | 360 | 890 | 86/97 | 97/93 | 1.92 |
| 12 | 300 | 890 | 92/100 | 98/96 | 1.96 |

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents and publications cited herein are incorporated by reference in their entirety.

What is claimed is:

1. A process of preparing a product gas mixture comprising CO and $H_2$ from a $C_1$–$C_5$ hydrocarbon and $O_2$, the process comprising:

contacting a reactant gas mixture comprising said hydrocarbon and a source of molecular oxygen with a catalytically effective amount of a supported catalyst comprising a nickel-rhodium alloy containing about 1–50 weight percent nickel and about 0.01–10 weight percent rhodium, and optionally further comprising, at least one metal chosen from the group consisting of lanthanide elements, zirconium, cobalt, manganese and magnesium, and a support structure; and maintaining said supported catalyst and said reactant gas mixture at catalytic partial oxidation promoting conditions of temperature, gas flow rate and feed composition during said contacting.

2. The process of claim 1 wherein said support structure comprises a substance selected from the group consisting of spinels, perovskites, magnesium oxide, pyrochlores, brownmillerites, zirconium phosphate, magnesium stabilized zirconia, zirconia stabilized alumina, silicon carbide, yttrium stabilized zirconia, calcium stabilized zirconia, yttrium aluminum garnet, alumina, cordierite, $ZrO_2$, $MgAl_2O_4$, $SiO_2$, and $TiO_2$.

3. The process of claim 2 wherein said support structure comprises a substance chosen from the group consisting of spinels, perovskites, pyrochlores and brownmillerites, and said nickel and said rhodium are incorporated into said support structure.

4. The process of claim 1 wherein said support structure comprises a nickel-rhodium alloy and magnesium oxide.

5. The process of claim 1 wherein said step of maintaining said catalyst and said reactant gas mixture at conversion promoting conditions of temperature, gas flow rate and feed composition during said contacting includes maintaining a temperature of about 600–1200° C.

6. The process of claim 5 wherein said step of maintaining a temperature includes maintaining a temperature of about 700–1100° C.

7. The process of claim 1 wherein said step of maintaining said catalyst and said reactant gas mixture at conversion promoting conditions of temperature, gas flow rate and feed composition during said contacting includes maintaining a pressure of about 100–12,500 kPa.

8. The process of claim 7 wherein said step of maintaining a pressure includes maintaining a pressure of about 130–10,000 kPa.

9. The process of claim 1 further comprising mixing a methane-containing feedstock and an oxygen-containing feedstock to provide a reactant gas mixture feedstock having a carbon:oxygen ratio of about 1.25:1 to about 3.3:1.

10. The process of claim 9 wherein said mixing provides a reactant gas mixture feed having a carbon:oxygen ratio of about 1.3:1 to about 2.2:1.

11. The process of claim 10 wherein said mixing provides a reactant gas mixture feed having a carbon:oxygen ratio of about 1.5:1 to about 2.2:1.

12. The process of claim 11 wherein said mixing provides a reactant gas mixture feed having a carbon:oxygen ratio of about 2:1.

13. The process of claim 9 wherein said oxygen-containing gas further comprises steam, $CO_2$, or a combination thereof.

14. The process of claim 1 further comprising mixing a hydrocarbon feedstock and a gas comprising steam and/or $CO_2$ to provide said reactant gas mixture.

15. The process of claim 1 wherein said $C_1$–$C_5$ hydrocarbon comprises at least about 50% methane by volume.

16. The process of claim 15 wherein said $C_1$–$C_5$ hydrocarbon comprises at least about 80% methane by volume.

17. The process of claim 1 further comprising preheating said reactant gas mixture.

18. The process of claim 1 further comprising passing said reactant gas mixture over said catalyst at a space velocity of about 20,000 to about 100,000,000 normal liters of gas per kilogram of catalyst per hour (NL/kg/h).

19. The process of claim 18 wherein said step of passing said reactant gas mixture over said catalyst comprises passing said mixture at a space velocity of about 50,000 to about 50,000,000 NL/kg/h.

20. The process of claim 1 wherein said step of contacting said supported catalyst and said reactant gas mixture includes maintaining a contact time of no more than about 10 milliseconds.

21. The process of claim 1 further comprising retaining said catalyst in a fixed bed reaction zone.

22. A process of converting a $C_1$–$C_5$ hydrocarbon comprising at least about 50 vol % methane to a product gas mixture comprising CO and $H_2$ in a molar ratio of about 2:1, the process comprising:

mixing a methane-containing feedstock and an oxygen-containing feedstock to provide a reactant gas mixture feedstock having a carbon:oxygen ratio of about 1.25:1 to about 3.3:1;

in a millisecond contact time reactor, contacting said reactant gas mixture feedstock with a catalytically effective amount of a supported catalyst comprising a nickel-rhodium alloy containing about 1–50 weight percent nickel, about 0.01–10 weight percent rhodium, and, optionally, at least one metal chosen from the group consisting of a lanthanide element, zirconium, cobalt, manganese and magnesium, and a support structure comprising a substance chosen from the group consisting of spinels, perovskites, pyrochlores and brownmillerites;

passing said reactant gas mixture feedstock over said catalyst at a space velocity of about 20,000 to about 100,000,000 normal liters of gas per kilogram of catalyst per hour (NL/kg/h);

during said contacting, maintaining said supported catalyst and said reactant gas mixture at a temperature of about 600–1200° C.; and during said contacting, maintaining said supported catalyst and said reactant gas mixture at a pressure of about 100–12,500 kPa.

23. A process of preparing a product gas mixture comprising CO and $H_2$ from a $C_1$–$C_5$ hydrocarbon and $O_2$, the process comprising:

contacting a reactant gas mixture comprising said hydrocarbon and a source of molecular oxygen with a catalytically effective amount of a supported catalyst comprising an alloy of nickel and rhodium and optionally further comprising, at least one metal chosen from the group consisting of lanthanide elements, zirconium, cobalt, manganese and magnesium; and maintaining catalytic partial oxidation promoting conditions during said contacting, including operating said process at superatmospheric reactant gas pressure.

24. The process of claim 23 wherein said contacting comprises contacting the reactant gas mixture with a catalytically effective amount of a supported catalyst comprising an alloy of nickel and rhodium and further comprising a lanthanide element.

25. The process of claim 24 wherein said contacting comprises contacting the reactant gas mixture with a catalytically effective amount of a supported catalyst comprising an alloy of nickel and rhodium and further comprising lanthanum.

26. The process of claim 23 wherein said contacting comprises contacting the reactant gas mixture with a catalytically effective amount of a supported catalyst comprising an alloy of nickel and rhodium and further comprising zirconium.

27. The process of claim 23 wherein said contacting comprises contacting the reactant gas mixture with a catalytically effective amount of a supported catalyst comprising an alloy of nickel and rhodium and further comprising cobalt.

28. The process of claim 23 wherein said contacting comprises contacting the reactant gas mixture with a catalytically effective amount of a supported catalyst comprising an alloy of nickel and rhodium and further comprising manganese.

29. The process of claim 23 wherein said contacting comprises contacting the reactant gas mixture with a catalytically effective amount of a supported catalyst comprising an alloy of nickel and rhodium and further comprising magnesium.

30. The process of claim 23 wherein said contacting comprises contacting the reactant gas mixture with a supported catalyst comprising a monolith form.

31. The process of claim 23 wherein said contacting comprises contacting the reactant gas mixture with a supported catalyst comprising a particulate form.

32. The process of claim 23 wherein said contacting comprises contacting the reactant gas mixture with a catalytically effective amount of a supported catalyst comprising nickel, rhodium, and, optionally, at least one metal chosen from the group consisting of lanthanide elements, zirconium, cobalt, manganese and magnesium, said catalyst having been prepared by a method comprising forming a Ni—Rh alloy.

* * * * *